(12) United States Patent
Hebbar

(10) Patent No.: US 12,535,829 B2
(45) Date of Patent: Jan. 27, 2026

(54) INFORMATION PROCESSING DEVICE, INFORMATION PROCESSING METHOD, AND MOVING APPARATUS

(71) Applicant: SONY GROUP CORPORATION, Tokyo (JP)

(72) Inventor: IshwarPrakash Hebbar, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 140 days.

(21) Appl. No.: 18/551,036

(22) PCT Filed: Jan. 31, 2022

(86) PCT No.: PCT/JP2022/003676
§ 371 (c)(1),
(2) Date: Sep. 18, 2023

(87) PCT Pub. No.: WO2022/201867
PCT Pub. Date: Sep. 29, 2022

(65) Prior Publication Data
US 2024/0168494 A1    May 23, 2024

(30) Foreign Application Priority Data
Mar. 26, 2021   (JP) ................... 2021-054322

(51) Int. Cl.
*G05D 1/244* (2024.01)
*G01S 17/08* (2006.01)
*G05D 111/10* (2024.01)

(52) U.S. Cl.
CPC ............ *G05D 1/2446* (2024.01); *G01S 17/08* (2013.01); *G05D 2111/14* (2024.01)

(58) Field of Classification Search
None
See application file for complete search history.

(56) References Cited

U.S. PATENT DOCUMENTS

| 2018/0259976 A1* | 9/2018 | Williams | G05D 1/223 |
| 2019/0080612 A1* | 3/2019 | Weissman | G01S 13/758 |
| 2021/0284198 A1* | 9/2021 | Schmidt | B60W 60/0015 |

FOREIGN PATENT DOCUMENTS

| CN | 103186965 A | 7/2013 |
| JP | H04155407 A | 5/1992 |
| JP | 2007212184 A | 8/2007 |
| JP | 2019-198346 A | 11/2019 |
| WO | 2019/026715 A1 | 2/2019 |
| WO | WO-2019065317 A1 | 4/2019 |
| WO | 2020/183659 A1 | 9/2020 |

OTHER PUBLICATIONS

International Search Report and Written Opinion of PCT Application No. PCT/JP2022/003676, issued on Mar. 29, 2022, 08 pages of ISRWO.

* cited by examiner

*Primary Examiner* — Thomas E Worden
*Assistant Examiner* — Christopher A Buksa
(74) *Attorney, Agent, or Firm* — CHIP LAW GROUP

(57) ABSTRACT

An information processing device of the present disclosure includes a ranger that detects a distance to an end part of a stage and detects a predetermined pattern provided on the stage, with infrared light, and an estimator that estimates a self-location on the basis of a detection result of the ranger.

11 Claims, 16 Drawing Sheets

[FIG. 1]
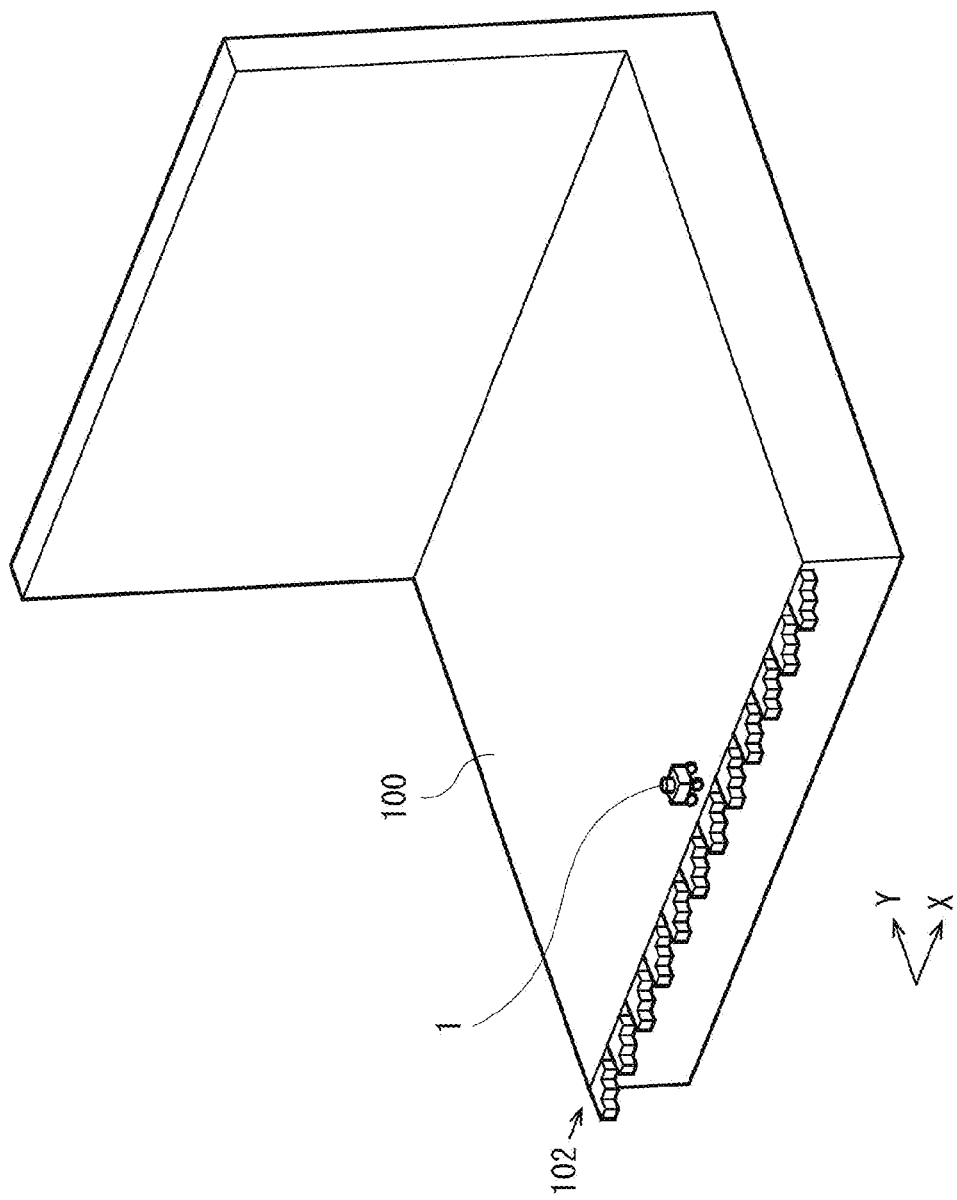

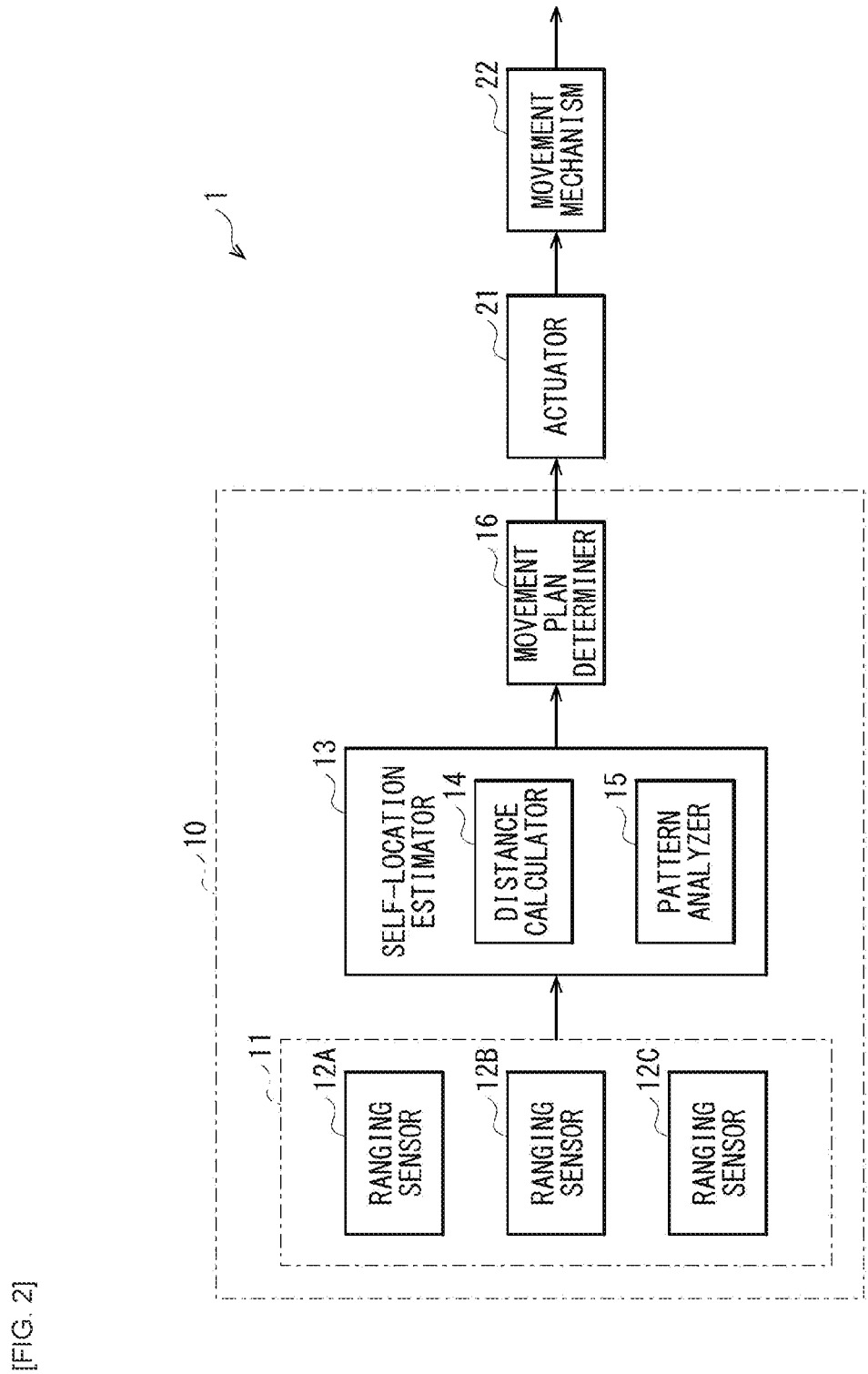
[FIG. 2]

[FIG. 3]
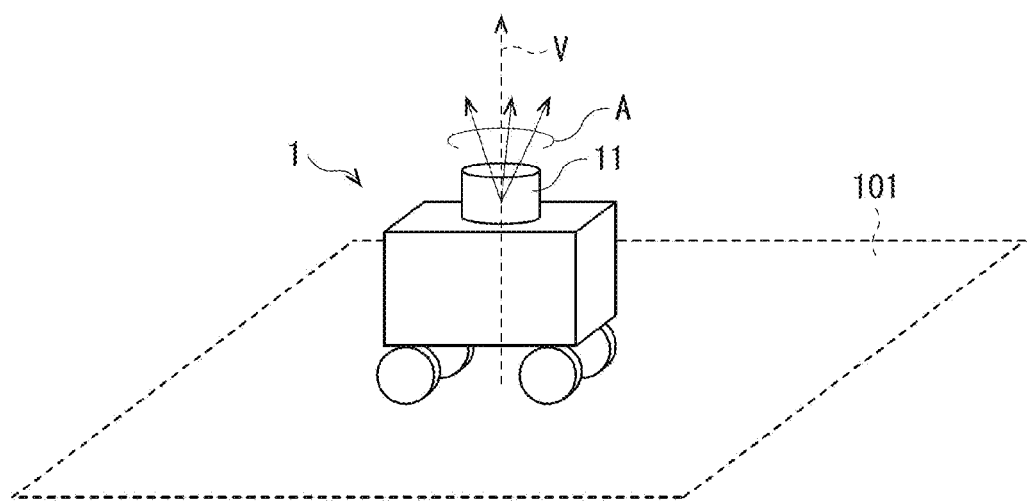

[FIG. 4]
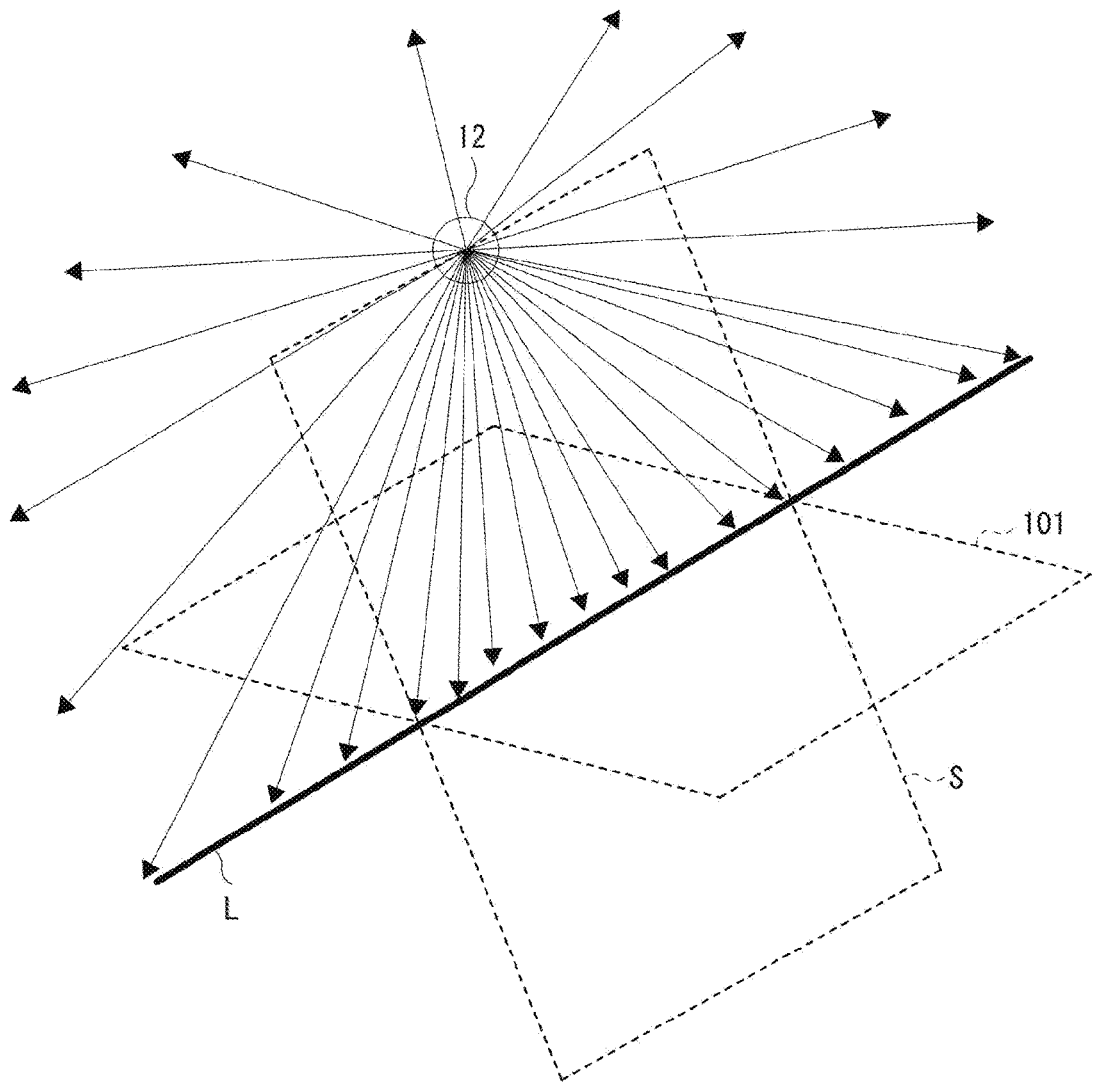

[FIG. 5]
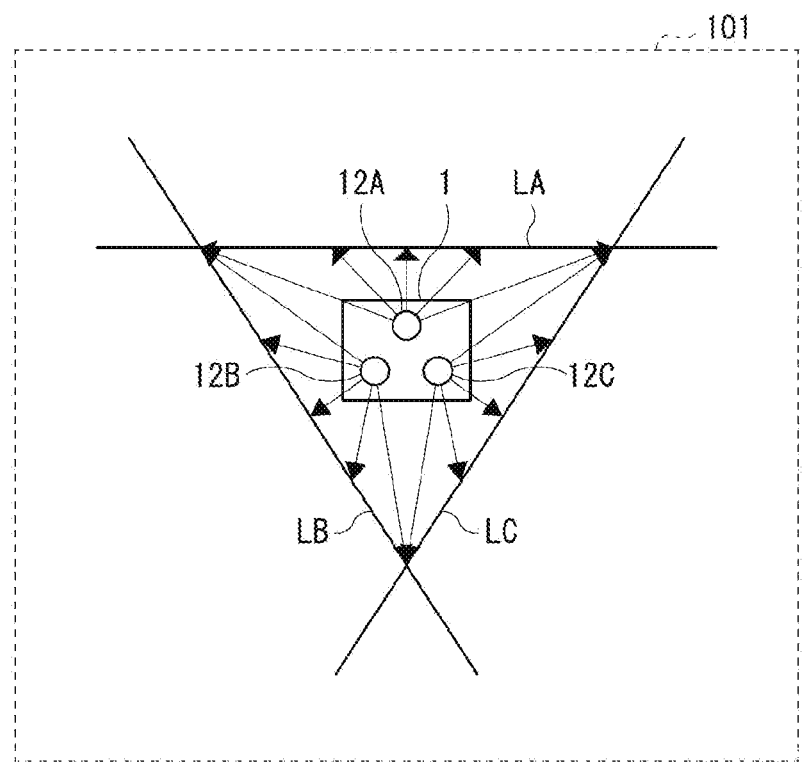

[FIG. 6]
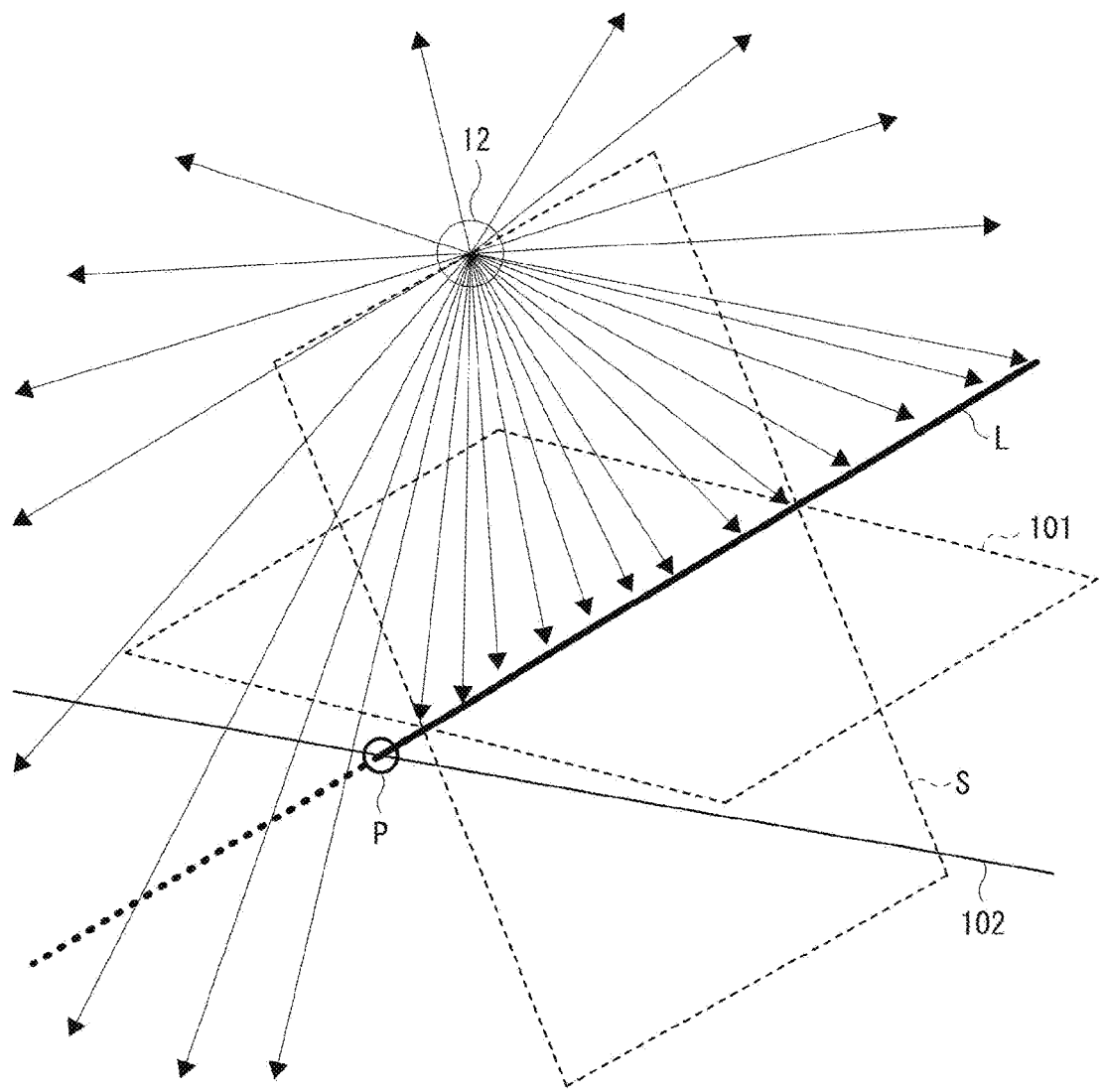

[FIG. 7]
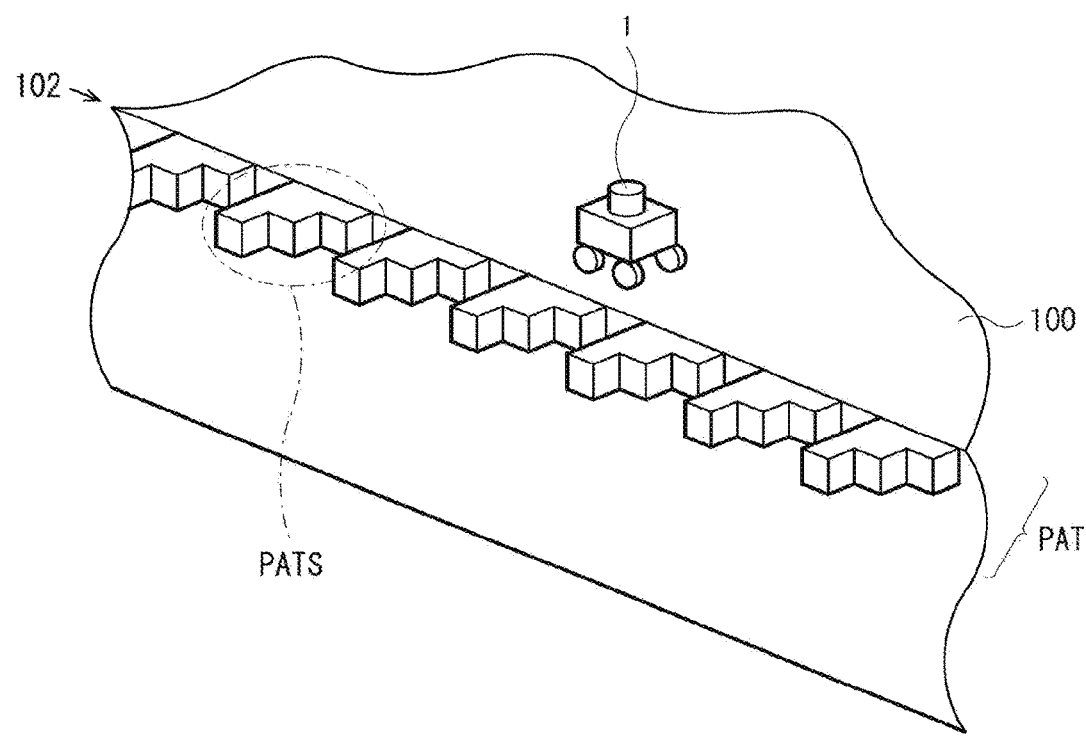
[FIG. 8]
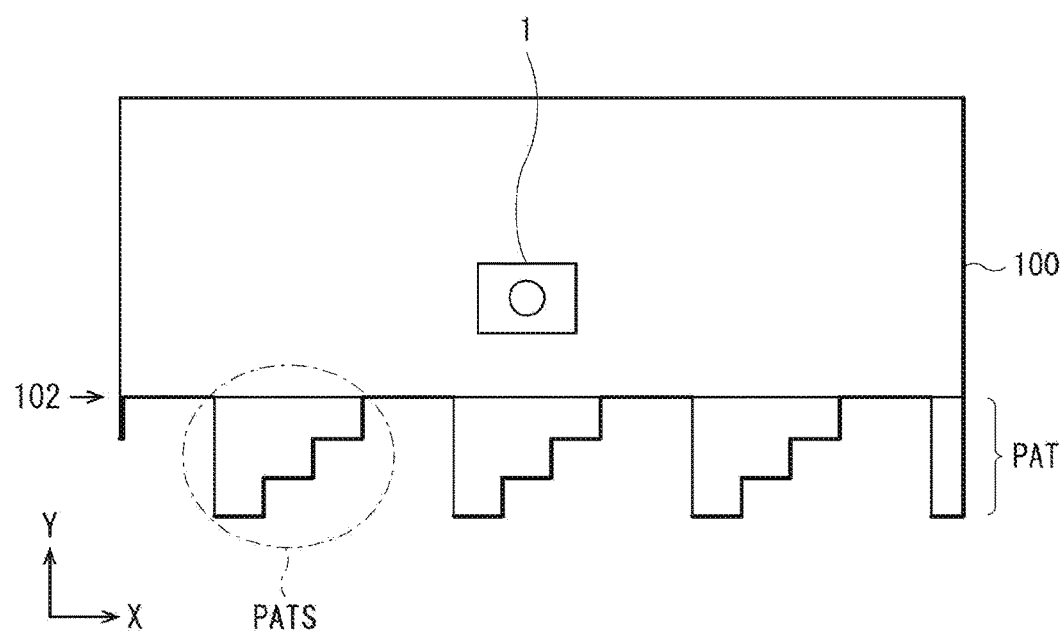

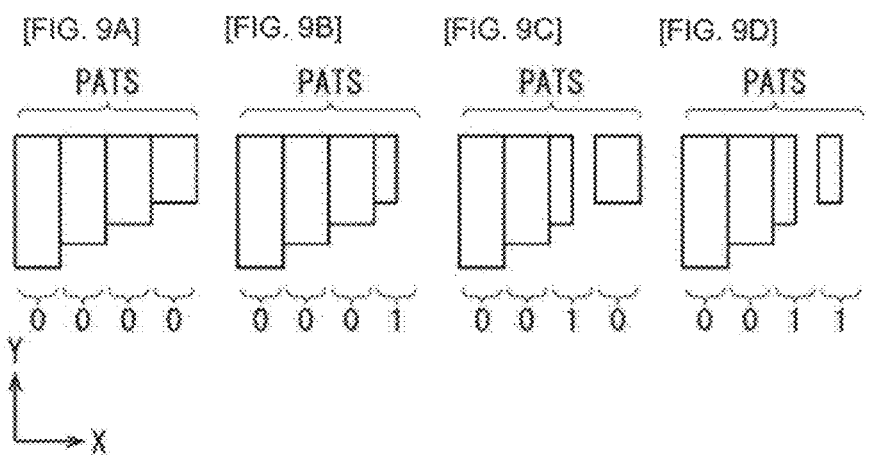
[FIG. 9A] [FIG. 9B] [FIG. 9C] [FIG. 9D]
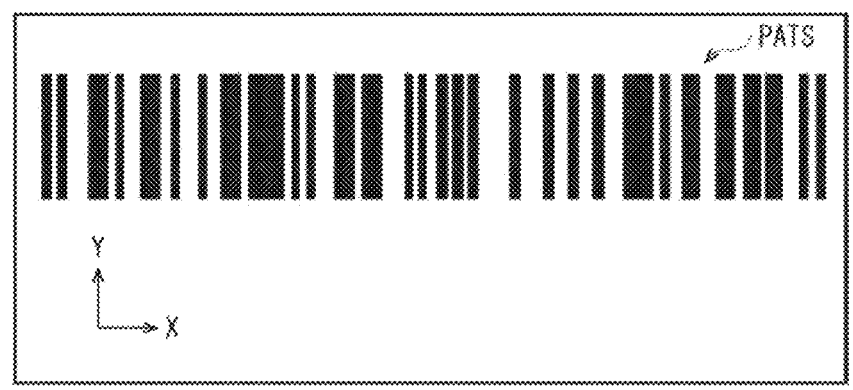
[FIG. 10]

[FIG. 11]
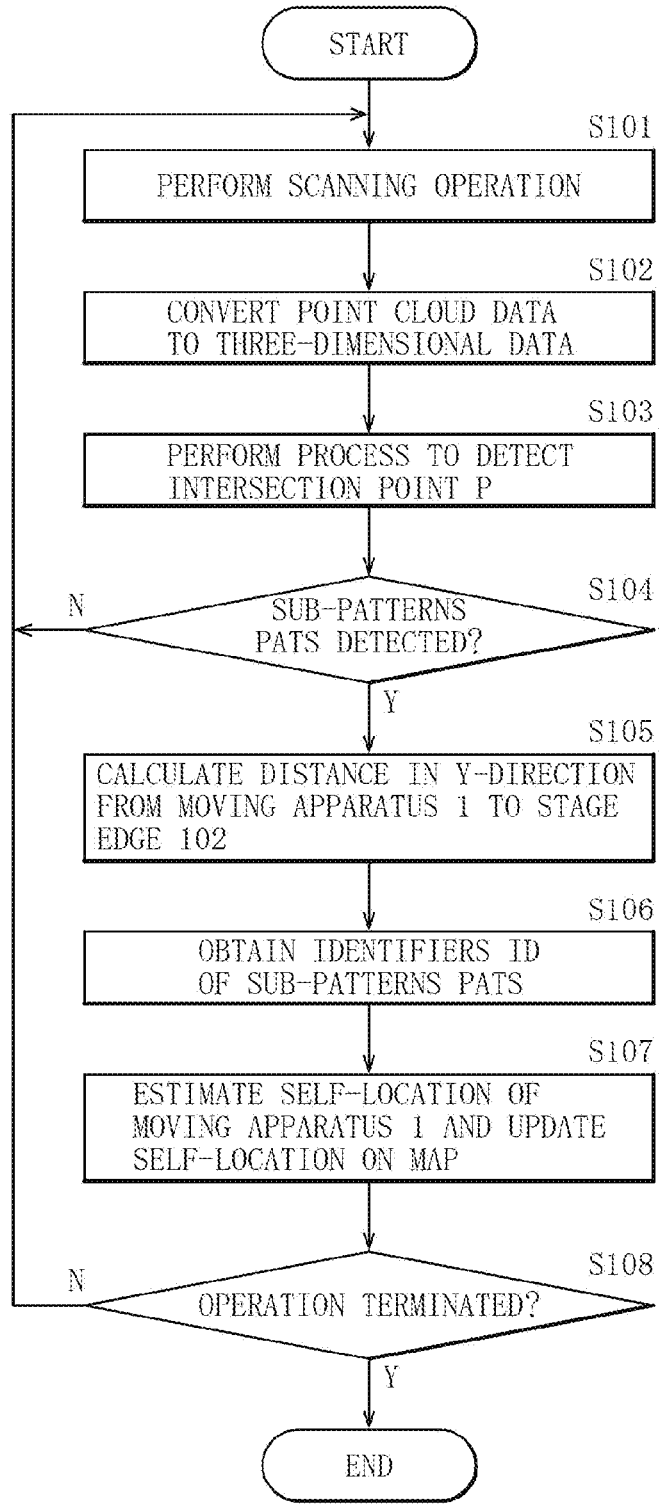

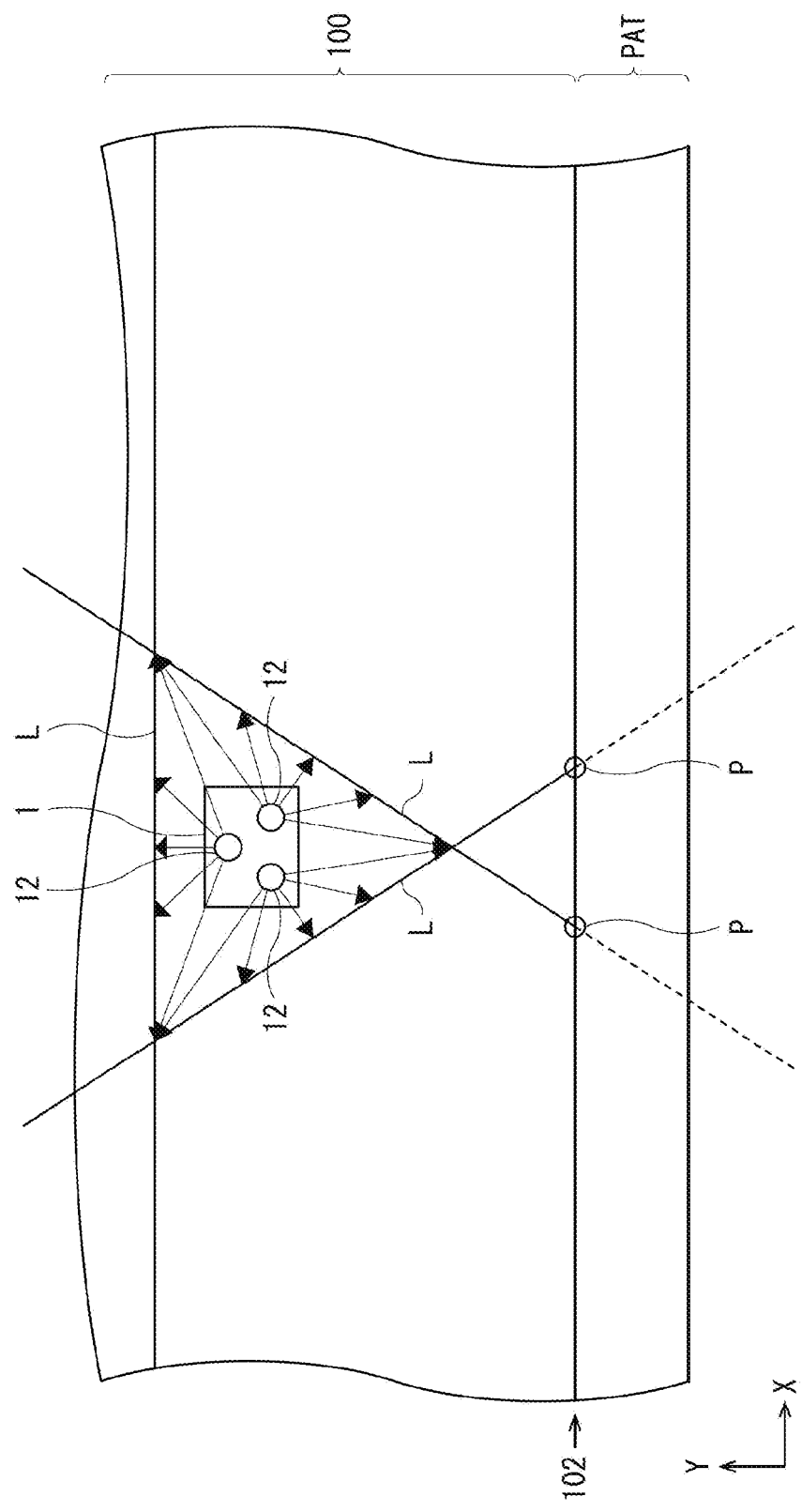
[FIG. 12]

[FIG. 13]
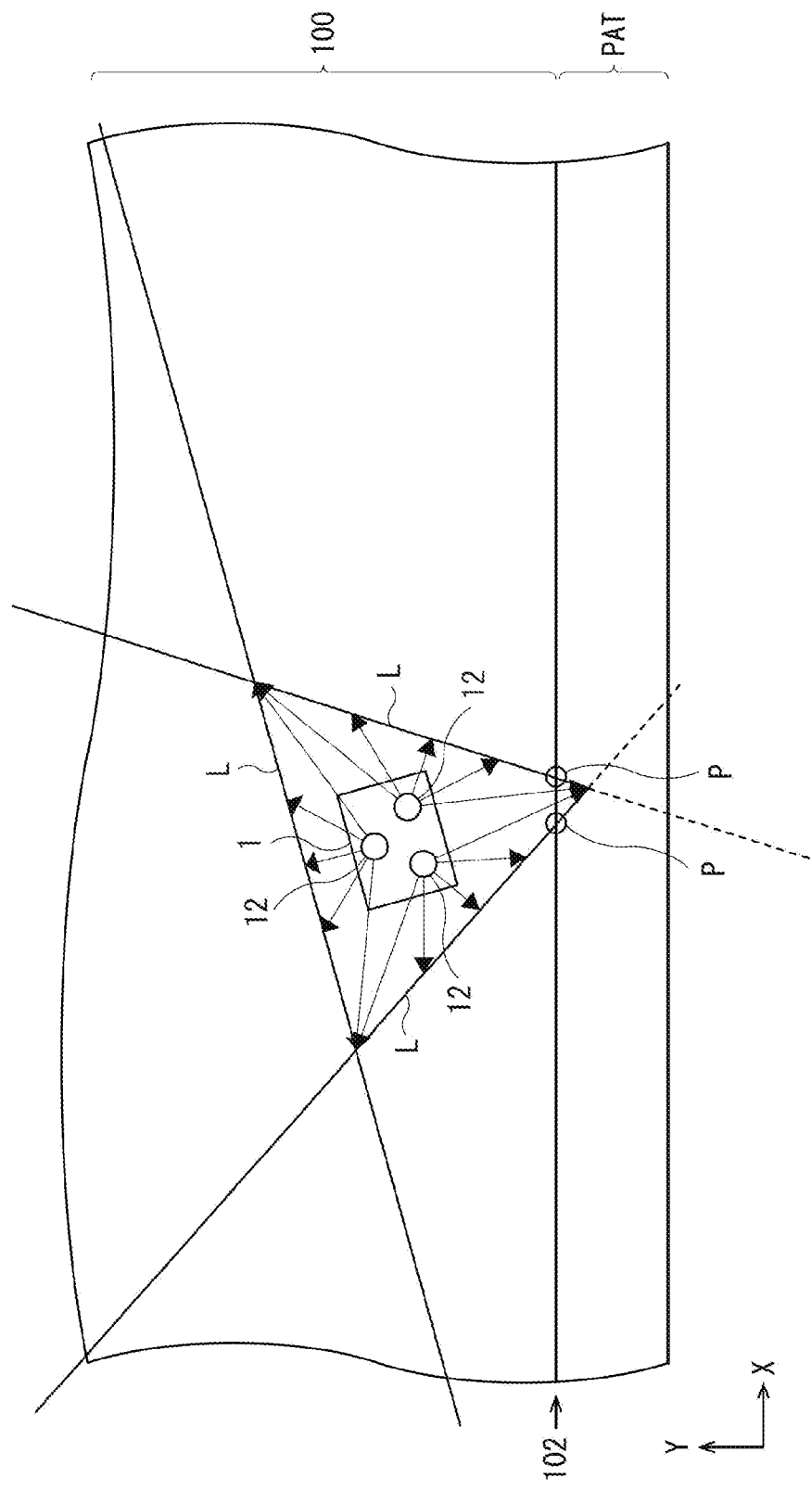

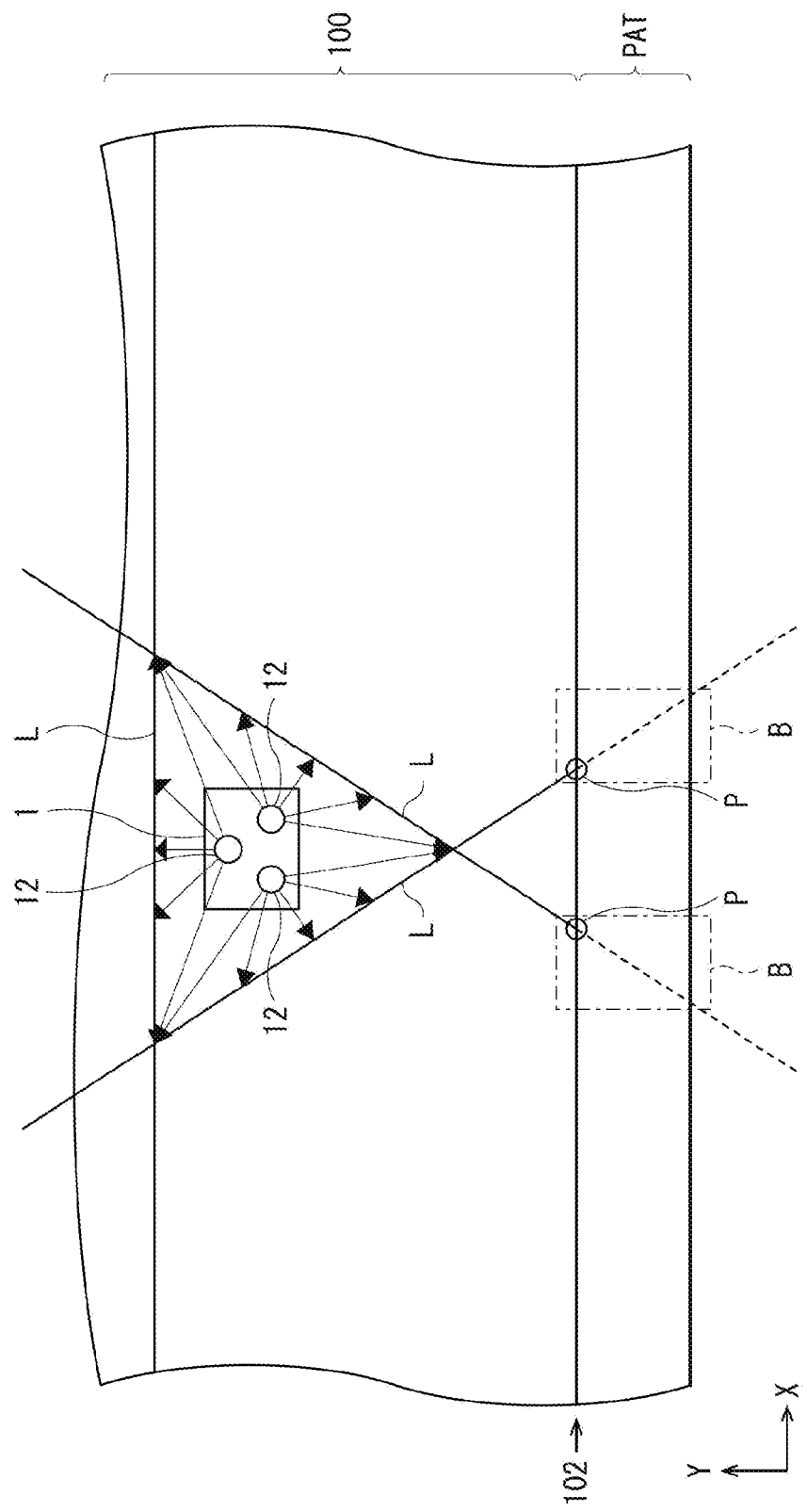

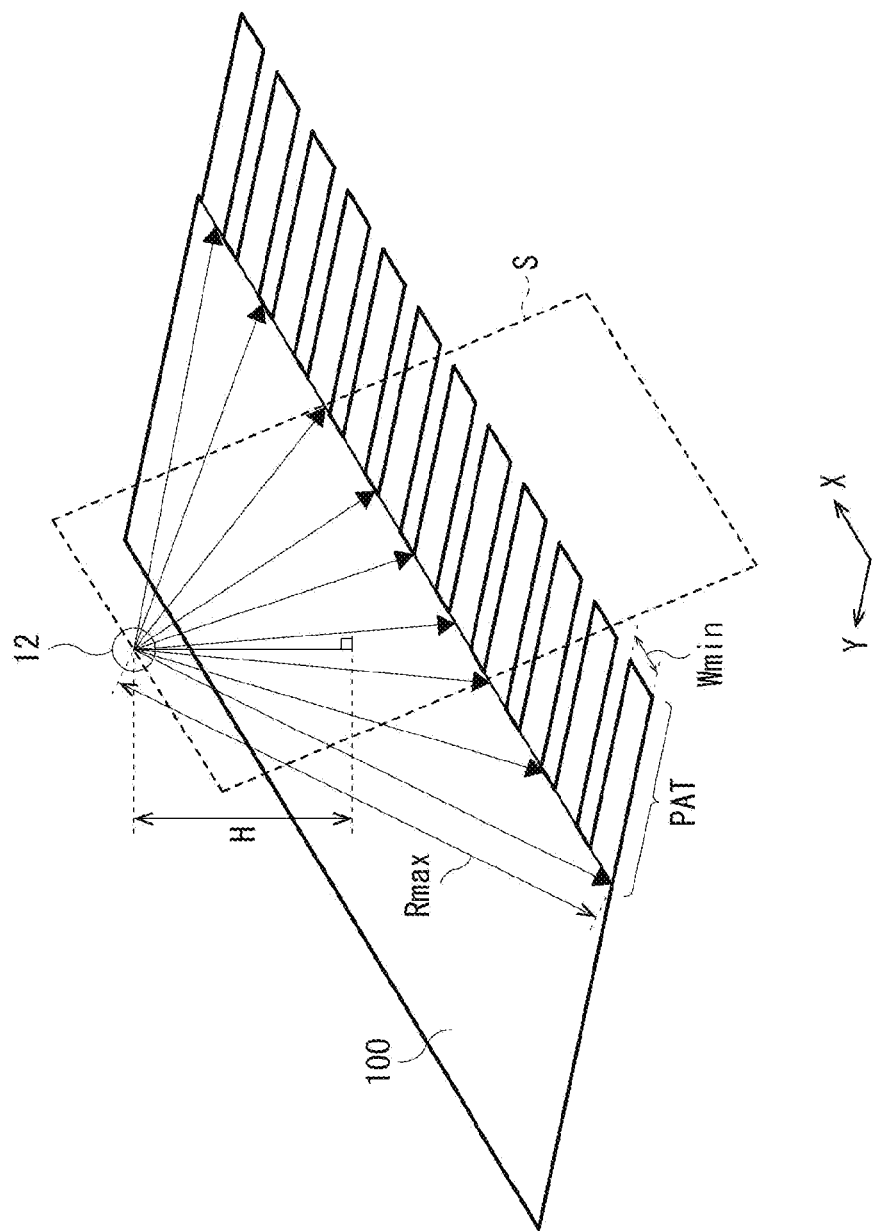
[FIG. 15]

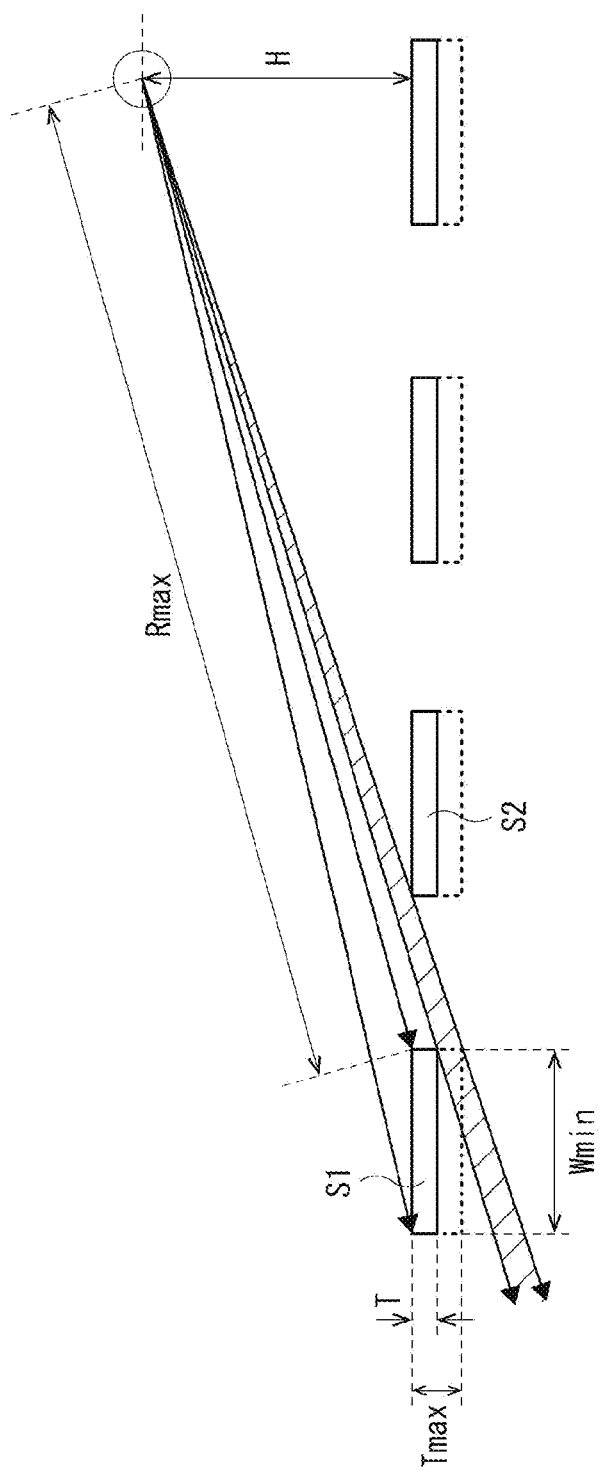
[FIG. 16]

[FIG. 17]
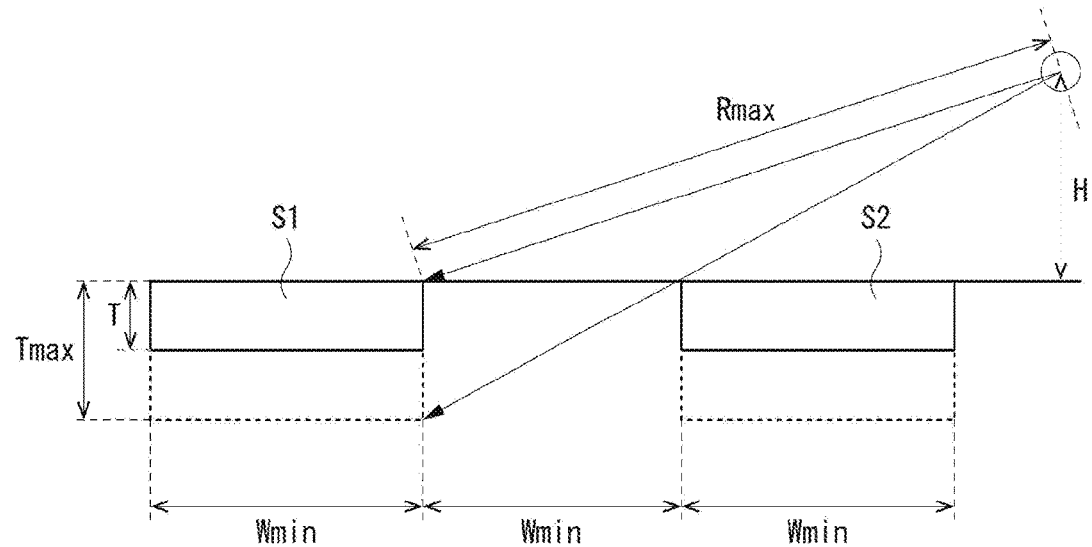
[FIG. 18]
| Rmax [m] | H [m] | Wmin [m] | T [m] |
|---|---|---|---|
| 10 | 1 | 0.1 | 0.005076 |
| 11 | 1 | 0.1 | 0.004606 |
| 12 | 1 | 0.1 | 0.004216 |
| 13 | 1 | 0.1 | 0.003888 |
| 14 | 1 | 0.1 | 0.003606 |
| 15 | 1 | 0.1 | 0.003363 |
| 16 | 1 | 0.1 | 0.003151 |
| 17 | 1 | 0.1 | 0.002964 |
| 18 | 1 | 0.1 | 0.002798 |
| 19 | 1 | 0.1 | 0.002649 |

[FIG. 19]
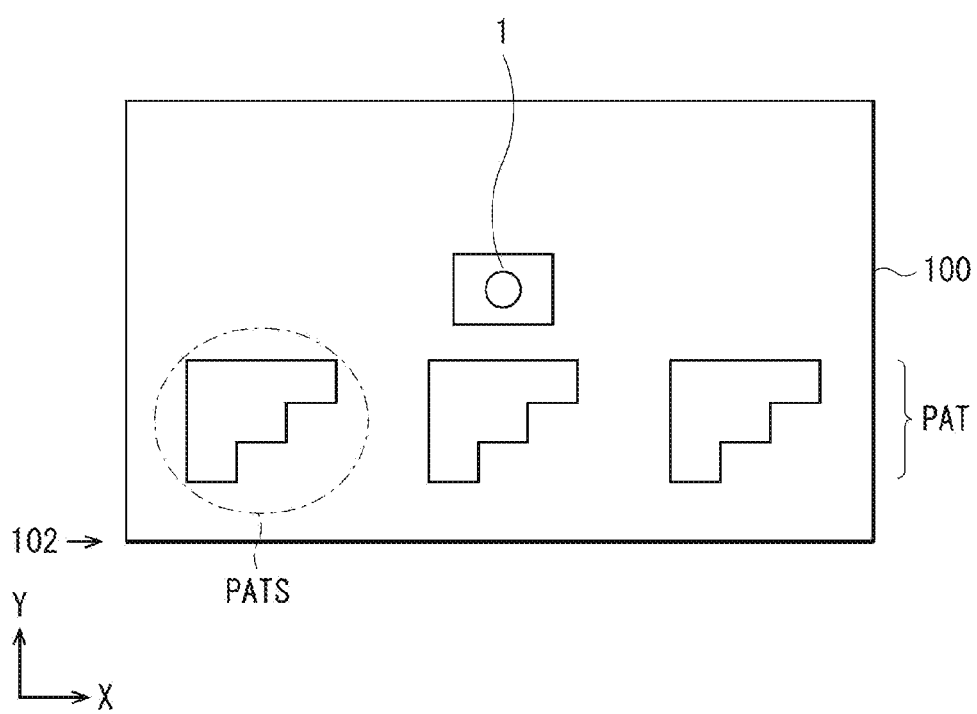

INFORMATION PROCESSING DEVICE, INFORMATION PROCESSING METHOD, AND MOVING APPARATUS

CROSS REFERENCE TO RELATED APPLICATIONS

This application is a U.S. National Phase of International Patent Application No. PCT/JP2022/003676 filed on Jan. 31, 2022, which claims priority benefit of Japanese Patent Application No. JP 2021-054322 filed in the Japan Patent Office on Mar. 26, 2021. Each of the above-referenced applications is hereby incorporated herein by reference in its entirety.

TECHNICAL FIELD

The present disclosure relates to an information processing device, an information processing method, and a moving apparatus in which a self-location is estimated by performing ranging.

BACKGROUND ART

Some information processing devices are installed in a moving apparatus to estimate a self-location of the moving apparatus. For example, PTL 1 discloses a technology in which a distance to a thing therearound and a direction of the thing are detected using a LiDAR (light detection and ranging) device, a map is created on the basis of the detection result, and a self-location is estimated on the basis of the map.

CITATION LIST

Patent Literature

PTL 2: WO 2020/183659

SUMMARY OF THE INVENTION

In this regard, a moving apparatus may move on a stage in a concert venue or the like. Even in such a case, it is desired that a self-location of the moving apparatus be estimated.

It is desirable to provide an information processing device, an information processing method, and a moving apparatus that make it possible to estimate a self-location on the stage.

An information processing device according to an embodiment of the present disclosure includes a ranger and an estimator. The ranger is configured to detect a distance to an end part of a stage and detect a predetermined pattern provided on the stage, with infrared light. The estimator is configured to estimate a self-location on the basis of a detection result of the ranger.

An information processing method according to the embodiment of the present disclosure includes: detecting, using a ranger that performs ranging with infrared light, a distance to an end part of a stage and a predetermined pattern provided on the stage; and estimating a self-location on the basis of a detection result of the ranger.

A moving apparatus according to the embodiment of the present disclosure includes a ranger, an estimator, and a movement mechanism. The ranger is configured to detect a distance to an end part of a stage and detect a predetermined pattern provided on the stage, with infrared light. The estimator is configured to estimate a self-location on the basis of a detection result of the ranger. The movement mechanism is configured to cause the apparatus to move on the basis of an estimation result of the estimator.

In the information processing device, the information processing method, and the moving apparatus according to the embodiment of the present disclosure, a ranger that performs ranging with infrared light is used to detect a distance to an end part of a stage and detect a predetermined pattern provided on the stage. Then, a self-location is estimated on the basis of a detection result of the ranger.

BRIEF DESCRIPTION OF DRAWINGS

FIG. 1 is an illustration illustrating a moving apparatus equipped with an information processing device according to an embodiment of the present disclosure and a configuration example of a stage on which the moving apparatus moves.

FIG. 2 is a block diagram illustrating a configuration example of the moving apparatus illustrated in FIG. 1.

FIG. 3 is an illustration illustrating a location of a ranger illustrated in FIG. 2.

FIG. 4 is an illustration illustrating an operation example of a ranging sensor illustrated in FIG. 2.

FIG. 5 is an illustration illustrating an operation example of three of the ranging sensors illustrated in FIG. 2.

FIG. 6 is another illustration illustrating an operation example of the ranging sensor illustrated in FIG. 2.

FIG. 7 is an illustration illustrating a configuration example of a pattern provided on the stage illustrated in FIG. 1.

FIG. 8 is another illustration illustrating a configuration example of the pattern illustrated in FIG. 7.

FIGS. 9A, 9B, 9C, and 9D are illustrations illustrating a specific example of a sub-pattern illustrated in FIG. 7.

FIG. 10 is an illustration illustrating another specific example of the sub-pattern illustrated in FIG. 7.

FIG. 11 is a flowchart illustrating an operation example of the moving apparatus illustrated in FIG. 2.

FIG. 12 is an illustration illustrating an operation example of the moving apparatus illustrated in FIG. 2.

FIG. 13 is another illustration illustrating an operation example of the moving apparatus illustrated in FIG. 2.

FIG. 14 is another illustration illustrating an operation example of the moving apparatus illustrated in FIG. 2.

FIG. 15 is an illustration illustrating an example of a parameter related to determination of a thickness of the pattern illustrated in FIG. 7.

FIG. 16 is an illustration illustrating an example of the thickness of the pattern illustrated in FIG. 7.

FIG. 17 is another illustration illustrating an example of the thickness of the pattern illustrated in FIG. 7.

FIG. 18 is another illustration illustrating an example of the thickness of the pattern illustrated in FIG. 7.

FIG. 19 is an illustration illustrating a configuration example of a pattern according to a modification example.

MODES FOR CARRYING OUT THE INVENTION

A detailed description will be made below on an embodiment of the present disclosure with reference to the drawings.

1. First Embodiment

Configuration Example

FIG. 1 illustrates a moving apparatus 1 equipped with an information processing device (an information processing device 10) according to an embodiment and a configuration example of a stage 100 on which the moving apparatus 1 moves. The stage 100, which is built in, for example, a concert venue, is configured to allow a musician to perform on the stage 100. The moving apparatus 1 is, for example, a robot that travels on the stage 100. The moving apparatus 1 can be used for, for example, a dolly equipped with a camera for shooting a musician during a performance of the musician.

A stage edge 102, which is an end part of the stage 100, is between the stage 100 and an auditorium in front of the stage 100. The moving apparatus 1 is movable on the stage 100 in an XY plane defined by a direction along the stage edge 102 (an X-direction) and a direction intersecting the stage edge 102 (a Y-direction). During a concert, various colored lights are applied for illumination and various loud sounds are made. In addition, a lot of electromagnetic waves may be generated by electronic equipment. In addition, for example, various cables are arranged on the stage, lighting and facilities are changed for each performance, and the like, which causes an environment to constantly change. The moving apparatus 1 is designed to travel on the stage 100 while estimating a self-location on the stage 100 in such a noisy environment that may constantly change.

FIG. 2 illustrates a configuration example of the moving apparatus 1. The moving apparatus 1 includes an information processing device 10, an actuator 21, and a movement mechanism 22.

The information processing device 10 includes a ranger 11, a self-location estimator 13, and a movement plan determiner 16.

The ranger 11 is configured to detect a distance to an object around the moving apparatus 1. The ranger 11 includes a plurality of ranging sensors 12 (in this example, three ranging sensors 12A, 12B, 12C). The ranging sensors 12 are two-dimensional LiDAR devices. The ranging sensors 12 each detect a distance to an object within a detection plane S intersecting a main axis A of the ranging sensor 12. The ranging sensors 12 each output an infrared optical pulse in various directions in the detection plane S and detect an optical pulse reflected by the object. The ranging sensors 12 then each detect a direction of the object on the basis of a direction from which the optical pulse is detected and calculate a time of flight (ToF) on the basis of an output timing and a detection timing of the optical pulse, thereby detecting the distance to the object.

FIG. 3 illustrates a location example of the ranger 11. In this example, the ranger 11 is located in an upper portion of the moving apparatus 1. The respective main axes A of the three ranging sensors 12 are slanted in directions offset from a vertical direction V of a stage surface 101 of the stage 100.

FIG. 4 illustrates an operation example of the ranging sensor 12. The main axis A of each of the ranging sensors 12 is slanted in the direction offset from the vertical direction V as illustrated in FIG. 3, which causes a line (a straight line L) at which the detection plane S and the stage surface 101 intersect to be created as illustrated in FIG. 4. The ranging sensors 12 each detect a distance to each part forming the straight line L in the stage surface 101.

FIG. 5 illustrates the three straight lines L (straight lines LA, LB, LC) related to the three ranging sensors 12A, 12B, 12C. The detection plane S of the ranging sensor 12A intersects the stage surface 101 on the straight line LA, the detection plane S of the ranging sensor 12B intersects the stage surface 101 on the straight line LB, and the detection plane S of the ranging sensor 12C intersects the stage surface 101 on the straight line LC. In this example, the straight lines LA, LB, LC form a regular triangle. In other words, since the main axes A of the three ranging sensors 12A, 12B, 12C are directed in directions symmetrical to each other with reference to the vertical direction V, the straight lines LA, LB, LC form a regular triangle.

The three ranging sensors 12 are slantingly arranged in this manner. This makes it possible for the ranger 11 to detect the stage surface 101 of the stage 100.

The self-location estimator 13 (FIG. 2) is configured to estimate a location (a self-location) of the moving apparatus 1 on the stage 100 on the basis of a detection result of the ranger 11. The self-location estimator 13 has, for example, data indicating a map of the stage 100 and estimates the self-location using the map. The self-location estimator 13 includes a distance calculator 14 and a pattern analyzer 15.

The distance calculator 14 is configured to calculate a distance from the moving apparatus 1 to the stage edge 102. The distance calculator 14 calculates the distance to the stage edge 102 in a direction (the Y-direction) intersecting the stage edge 102 as illustrated in FIG. 1.

As illustrated in FIG. 4, the ranging sensors 12 each detect a distance to each part forming the straight line L in the stage surface 101. Since the ranger 11 includes the three ranging sensors 12 as illustrated in FIG. 5, two of the three straight lines L intersect the stage edge 102.

FIG. 6 illustrates an example of a case where the straight line L intersects the stage edge 102. The straight line L intersects the stage edge 102 at an intersection point P. In other words, one end of the straight line L is the intersection point P. The ranging sensors 12 each detect a distance to the stage surface 101 of the stage 100 in a near part with respect to the intersection point P and detect, for example, a distance to a floor of the auditorium in front of the stage 100 in a far part with respect to the intersection point P. Thus, distance values obtained by each of the ranging sensors 12 may vary across the intersection point P. This makes it possible for the ranging sensors 12 to detect the intersection point P on the basis of the distance values.

Since two of the three straight lines L intersect the stage edge 102, the intersection points P are created on the two of the three straight lines L. The distance calculator 14 performs a predetermined computation on the basis of distances from the moving apparatus 1 to the two intersection points P, thereby calculating a distance in the Y-direction from the moving apparatus 1 to the stage edge 102.

The pattern analyzer 15 is configured to analyze a pattern PAT located on the stage edge 102.

FIGS. 7 and 8 illustrate a configuration example of the pattern PAT located on the stage 100. The pattern PAT, which is a three-dimensional structure in this example, is in contact with the stage edge 102 and arranged in a projecting manner from the stage edge 102 toward the auditorium in front of the stage 100. The structure forming the pattern PAT has a thickness T in an up-and-down direction. A level of an upper surface of the pattern PAT is the same as a level of the stage surface 101 of the stage 100. The pattern PAT can include a material detectable by a LiDAR device, such as plastics, metal, or wood. In other words, the pattern PAT includes a material that reflects, for example, an infrared ray. The pattern PAT includes a plurality of sub-patterns PATS arranged along the stage edge 102 in the X-direction.

FIGS. 9A, 9B, 9C, and 9D illustrate a specific example of the sub-pattern PATS. In this example, the sub-pattern PATS is a pattern representing a 4-bit binary code. The sub-pattern PATS includes four parts corresponding one-to-one to the four bits. For example, a leftmost part of the sub-pattern PATS corresponds to an MSB (Most Significant Bit) and a rightmost part thereof corresponds to an LSB (Least Significant Bit). In this example, a part longer in the Y-direction means a higher-order bit. In other words, a length in the Y-direction of the leftmost part corresponding to the most significant bit is the longest and a length in the Y-direction of the rightmost part corresponding to the least significant bit is the shortest. A width in the X-direction of each of the four parts corresponds to a value of bit. In this example, a large width means "0" and a small width means "1." A binary code of the sub-pattern PATS illustrated in FIG. 9A is "0000", a binary code of the sub-pattern PATS illustrated in FIG. 9B is "0001", a binary code of the sub-pattern PATS illustrated in FIG. 9C is "0010", and a binary code of the sub-pattern PATS illustrated in FIG. 9D is "0011."

The plurality of sub-patterns PATS are arranged along the stage edge 103. The sub-patterns PATS differ with locations in the X-direction at which the sub-patterns are located. In other words, the binary codes indicated by the sub-patterns PATS differ with the locations in the X-direction at which the sub-patterns PATS are located. The binary codes are identifiers ID indicating locations in the X-direction.

FIG. 10 illustrates another specific example of the sub-pattern PATS. The sub-pattern PATS is a barcode pattern. For example, a black part in FIG. 10 is a part where the structure exists and a white part is a part where no structure exists. The barcode patterns differ with locations in the X-direction at which the sub-patterns PATS are located. In other words, codes indicated by the barcode patterns are the identifiers ID indicating the locations in the X-direction.

It should be noted that the examples in FIGS. 9A, 9B, 9C, 9D, and 10 are not limiting and the sub-patterns PATS can be provided by structures in various shapes. For example, the sub-patterns PATS have a shape including a combination of rectangular parallelepipeds in the example in FIGS. 9A, 9B, 9C, and 9D; however, it is not limiting. For example, the sub-patterns PATS may have a shape including a combination of cylinders having a circular or oval cross section or a shape including a combination of columns having a polygonal cross section.

The sub-patterns PATS indicating the identifiers ID according to the locations in the X-direction are located on the stage edge 102 in this manner. Point cloud data obtained on the basis of the detection result of the ranger 11 includes information regarding the sub-patterns PATS. The pattern analyzer 15 can thus obtain the identifiers ID indicating the locations in the X-direction of the sub-patterns PATS by analyzing the sub-patterns PATS.

In this manner, the distance calculator 14 calculates the distance in the Y-direction from the moving apparatus 1 to the stage edge 102 and the pattern analyzer 15 obtains the identifiers ID indicating the locations in the X-direction of the sub-patterns PATS. The self-location estimator 13 estimates the self-location in the Y-direction on the basis of a calculation result of the distance calculator 14 and estimates the self-location in the X-direction on the basis of an analysis result of the pattern analyzer 15. In this manner, the self-location estimator 13 estimates the self-location of the moving apparatus 1 on the stage 100.

The movement plan determiner 16 is configured to determine a movement plan for the moving apparatus 1 on the basis of the self-location estimated by the self-location estimator 13.

The actuator 21 is configured to generate power on the basis of the movement plan determined by the movement plan determiner 16 and drive the movement mechanism 22 on the basis of the power. The actuator 21 includes, for example, one or a plurality of motors.

The movement mechanism 22 is configured to cause the moving apparatus 1 to move on the basis of the power generated by the actuator 21. The movement mechanism 22 includes a plurality of wheels in this example.

Here, the ranger 11 corresponds to a specific example of a "ranger" of the present disclosure. The ranging sensor 12 corresponds to a specific example of a "ranging sensor" of the present disclosure. The main axis A corresponds to a specific example of a "main axis" of the present disclosure. The detection plane S corresponds to a specific example of a "detection plane" of the present disclosure. The pattern PAT corresponds to a specific example of a "predetermined pattern" of the present disclosure. The sub-pattern PATS corresponds to a specific example of a "sub-pattern" of the present disclosure. The self-location estimator 13 corresponds to a specific example of an "estimator" of the present disclosure. The movement mechanism 22 corresponds to a specific example of a "movement mechanism" of the present disclosure.

Operations and Workings

Subsequently, description will be made on operations and workings of the moving apparatus 1 of the present embodiment.

Outline of Overall Operation

First, description will be made on an outline of an overall operation of the moving apparatus 1 with reference to FIG. 2. The ranger 11 detects a distance to an object around the moving apparatus 1. The distance calculator 14 of the self-location estimator 13 calculates the distance in the Y-direction from the moving apparatus 1 to the stage edge 102. The pattern analyzer 15 of the self-location estimator 13 obtains the identifiers ID indicating the locations in the X-direction of the sub-patterns PATS by analyzing the pattern PAT located on the stage edge 102. The self-location estimator 13 estimates the self-location on the stage 100 on the basis of the calculation result of the distance calculator 14 and the analysis result of the pattern analyzer 15. The movement plan determiner 16 determines the movement plan for the moving apparatus 1 on the basis of the self-location estimated by the self-location estimator 13. The movement mechanism 22 causes the moving apparatus 1 to move on the basis of the power generated by the actuator 21.

Detailed Operations

FIG. 11 illustrates an operation example of the moving apparatus 1.

First, the ranger 11 performs a scanning operation (Step S101). Specifically, each of the three ranging sensors 12A, 12B, 12C of the ranger 11 detects a distance to an object within the detection plane S. The information processing device 10 thus generates point cloud data indicating surroundings of the moving apparatus 1.

Next, the self-location estimator 13 converts the obtained point cloud data to three-dimensional data (Step S102). The self-location estimator 13 performs a process on the basis of the three-dimensional data.

Next, the distance calculator 14 performs a process to detect the intersection point P (Step S103).

FIGS. 12 and 13 illustrate operation examples of the moving apparatus 1. These drawings illustrate merely a region of the pattern PAT without illustrating a specific shape of the pattern PAT. Two of the three straight lines L related to the three ranging sensors 12A, 12B, 12C intersect the stage edge 102. This causes the two intersection points P to be created. In the example in FIG. 12, the moving apparatus 1 is somewhat away from the stage edge 102; therefore, the two intersection points P are created outside the regular triangle formed by the three straight lines L. In the example in FIG. 13, the moving apparatus 1 is close to the stage edge 102; therefore, the two intersection points P are created on sides of the regular triangle formed by the three straight lines L.

Next, the pattern analyzer 15 checks whether or not the sub-patterns PATS are detected (Step S104).

FIG. 14 illustrates an operation example of the moving apparatus 1. The two straight lines L intersect the stage edge 102. Extensions of the two straight lines L thus cross a part of the pattern PAT, or a part B. The part B includes the sub-patterns PATS. The point cloud data obtained on the basis of the detection result of the ranger 11 includes the information regarding the sub-patterns PATS. The pattern analyzer 15 can thus detect the sub-patterns PATS on the basis of the three-dimensional data converted from the point cloud data.

In a case where none of the sub-patterns PATS can be detected in Step S104 (in Step S104, "N"), the process returns to Step S101.

In a case where the sub-patterns PATS can be detected in Step S104 (in Step S104, "Y"), the distance calculator 14 calculates the distance in the Y-direction from the moving apparatus 1 to the stage edge 102 (Step S105). Specifically, the distance calculator 14 performs the predetermined computation on the basis of distances from the moving apparatus 1 to the two intersection points P, thereby calculating the distance in the Y-direction from the moving apparatus 1 to the stage edge 102.

Next, the pattern analyzer 15 analyzes the sub-patterns PATS detected in Step S104, thereby obtaining the identifiers ID indicating the locations in the X-direction of the sub-patterns PATS (Step S106).

Next, the self-location estimator 13 estimates the self-location of the moving apparatus 1 on the basis of the analysis result of the distance calculator 14 and the pattern analyzer 15 and updates the self-location on the map (Step S107). Specifically, the self-location estimator 13 estimates the self-location in the Y-direction on the basis of the calculation result of the distance calculator 14 in Step S105 and estimates the self-location in the X-direction on the basis of the analysis result of the pattern analyzer 15 in Step S106, thereby estimating the self-location of the moving apparatus 1 on the stage 100. The self-location estimator 13 then updates the self-location on the map.

Next, the moving apparatus 1 checks whether or not the operation is to be terminated (Step S108). In a case where the operation is not to be terminated (in Step S108, "N"), the process returns to Step S101 and processes of Steps S101 to S108 are repeated until the operation is terminated. In contrast, in a case where the operation is to be terminated (in Step S108, "Y"), the flow is terminated.

In this manner, the self-location estimator 13 estimates the self-location of the moving apparatus 1 on the stage 100. The movement plan determiner 16 determines the movement plan for the moving apparatus 1 on the basis of the self-location estimated by the self-location estimator 13. The actuator 21 generates power on the basis of the movement plan determined by the movement plan determiner 16 and the movement mechanism 22 causes the moving apparatus 1 to move on the basis of the power generated by the actuator 21.

Regarding Thickness of Pattern PAT

Next, description will be made on the thickness T in the up-and-down direction of the structure forming the pattern PAT.

FIG. 15 illustrates a parameter used to determine the thickness T. The thickness T of the pattern PAT is determined by a minimum width Wmin of the pattern PAT, a level (a height H) of the ranging sensor 12, and a maximum ranging range Rmax of the ranging sensor 12.

The minimum width Wmin of the pattern PAT is a minimum width in the X-direction of the pattern PAT. For example, the minimum width Wmin corresponds to a narrow width indicating a bit value "1" in the example in FIGS. 9A, 9B, 9C, and 9D. Meanwhile, the minimum width Wmin corresponds to a finest line in the example in FIG. 10.

The height H of the ranging sensor 12 is a height of the ranging sensor 12 from the stage surface 101.

The maximum ranging range Rmax of the ranging sensor 12 is a maximum distance for the ranging sensor 12 to be able to detect a pattern with the minimum width in the pattern PAT.

FIGS. 16 and 17 illustrate the thickness T of the pattern PAT. FIGS. 16 and 17 illustrate two structures S1, S2 adjacent to each other and that form the pattern PAT, the structures S1, S2 being located at positions compatible with the maximum ranging range Rmax of the ranging sensor 12. As represented by a diagonal line in FIG. 16, the optical pulse outputted from the ranging sensor 12 is caused to pass through between the two structures S1, S2, which makes it possible for the ranging sensor 12 to distinguish between the structures S1, S2 adjacent to each other to perform an accurate detection. In other words, for example, in a case where the thickness T of the pattern PAT is a thickness Tmax, the optical pulse outputted from the ranging sensor 12 cannot pass through between the two structures S1, S2. In this case, a difference between distances between the ranging sensor 12 and the structures S1, S2 is small and thus it is difficult to distinguish between the structures S1, S2 to perform an accurate detection. In contrast, the thickness T of the pattern PAT is a half of the thickness Tmax in this example. This allows the optical pulse outputted from the ranging sensor 12 to pass through between the two structures S1, S2. As a result, the structures S1, S2 can be distinguished from each other to perform an accurate detection.

In the example in FIG. 17, a space between the structures S1, S2 is the minimum width Wmin of the pattern PAT. In this case, the thickness T of the pattern PAT can be represented by the following expression.

$$T = 0.5 \times \frac{Wmin \times H}{\sqrt{Rmax^2 - H^2} - Wmin} \qquad \text{[Math. 1]}$$

FIG. 18 illustrates an example of the thickness T of the pattern PAT. For example, the maximum ranging range Rmax can be increased by reducing the thickness T of the pattern PAT. This makes it possible to use the moving apparatus 1 on, for example, the large stage 100.

In this manner, the moving apparatus 1 includes the ranger 11 that detects a distance to an end part (the stage edge 102) of the stage 100 and detects the pattern PAT located on the stage 100 with infrared light and the self-location estimator 13 that estimates the self-location on the basis of the detection result of the ranger 11. This makes it possible for the moving apparatus 1 to estimate the self-location on the stage 100.

In other words, during a concert, various colored lights are applied for illumination and various loud sounds are made. In addition, a lot of electromagnetic waves may be generated by electronic equipment. In addition, for example, various cables are arranged on the stage, lighting and facilities are changed for each performance, and the like, which causes an environment to constantly change. In such a noisy environment that may constantly change, it is difficult to estimate the self-location by a technology such as radar, LiDAR SLAM (Simultaneous Localization and Mapping), Wheel Odometry, Visual Odometry, or Alvar.

While the environment may constantly change as described above, the stage edge 102 does not usually change. Accordingly, the moving apparatus 1 detects the self-location of the moving apparatus 1 by using the stage edge 102. This makes it possible for the moving apparatus 1 to estimate the self-location even in a noisy environment that may constantly change as described above.

In addition, the pattern PAT includes the plurality of sub-patterns PATS different from each other and that are arranged on the stage edge 102 side by side in the X-direction along the stage edge 102. This makes it possible for the moving apparatus 1 to detect a location in the X-direction on the basis of the sub-patterns PATS and, consequently, estimate the self-location.

In addition, the three ranging sensors 12 each measure a distance to an object within the detection plane S intersecting the main axis A. Moreover, the direction of the main axis A of each of the three ranging sensors 12 is different from the vertical direction of the stage surface 101 of the stage 100. This makes it possible for the three ranging sensors 12 to detect the stage surface 101 of the stage 100 and, consequently, detect the distance to the stage edge 102 and detect the pattern PAT located on the stage 100. As a result, the moving apparatus 1 can estimate the self-location.

In addition, the moving apparatus 1 includes the three ranging sensors 12 and the lines at which the respective detection planes S of the three ranging sensors 12 intersect the stage surface 101 form a regular triangle. This makes it possible for the moving apparatus 1 to perform a computation process on the basis of the point cloud data with use of symmetry. The computation process can thus be simplified.

Effects

As described hereinabove, in the present embodiment, a ranger that detects a distance to an end part of a stage and detects a pattern provided on the stage, with infrared light, and a self-location estimator that estimates a self-location on the basis of a detection result of the ranger are provided. This makes it possible to estimate the self-location on the stage.

In the present embodiment, the pattern includes a plurality of sub-patterns that is different from each other and that is arranged on a stage edge side by side in a direction along the state edge. This makes it possible to estimate the self-location.

Modification Example 1

In the above-described embodiment, the three ranging sensors 12 are provided but it is not limiting. Instead of that, for example, four or more of the ranging sensors 12 may be provided. Even in this case, for example, lines at which the respective detection planes S of the plurality of ranging sensors 12 intersect the stage surface 101 can form a regular polygon. Specifically, in a case where, for example, four of the ranging sensors 12 are provided, lines at which the respective detection planes S of the four ranging sensors 12 intersect the stage surface 101 can form a square. In addition, in a case where, for example, six of the ranging sensors 12 are provided, lines at which the respective detection planes S of the six ranging sensors 12 intersect the stage surface 101 can form a regular hexagon.

Modification Example 2

In the above-described embodiment, two-dimensional LiDAR devices are used to provide the ranging sensors 12 but it is not limiting. Instead of that, for example, three-dimensional LiDAR devices may be used to provide the ranging sensors 12. In this case, the number of the ranging sensors 12 may be one or more.

Modification Example 3

In the above-described embodiment, a three-dimensional structure is used to provide the pattern PAT but it is not limiting. Instead of that, for example, a print product printed on the stage surface 101 of the stage 100 or a sticker stuck on the stage 100 may be used to provide the pattern PAT in a form of a flat pattern as illustrated in FIG. 19. In this example, the pattern PAT is located close to the stage edge 102 on the stage surface 101 of the stage 100. The pattern PAT can include a material detectable by a LiDAR device. For example, in a case where the stage surface 101 includes a material that reflects an infrared ray, the pattern PAT includes, for example, a material that does not reflect an infrared ray. For example, Vantablack is usable as the material that does not reflect an infrared ray. The pattern PAT includes a plurality of sub-patterns PATS arranged along the stage edge 102 in the X-direction.

It should be noted that the pattern PAT is located close to the stage edge 102 in this example but it is not limiting. The pattern PAT may be located at a position somewhat away from the stage edge 102. The pattern PAT likewise includes the plurality of sub-patterns PATS arranged along the stage edge 102 in the X-direction in this case. This makes it possible for the moving apparatus 1 to detect the self-location in the X-direction on the basis of the pattern PAT.

Other Modification Examples

In addition, two or more of the modification examples may be combined.

Hereinabove, the present technology is described with reference to the embodiment and the modification examples; however, the present technology is not limited to the embodiment, etc. and a variety of modifications are possible.

For example, in the above-described embodiment, the three-dimensional structure is sued to provide the pattern PAT but it is not limiting. For example, a mat provided with the pattern PAT may be located on the stage 100.

It should be noted that the effects described herein are merely by way of example and not limiting and another effect is also possible.

It should be noted that the present technology can be implemented by the following configuration. The present technology with the following configuration enables estimating a self-location on a stage.

(1)
An information processing device including:
a ranger that detects a distance to an end part of a stage and detects a predetermined pattern provided on the stage, with infrared light; and
an estimator that estimates a self-location on the basis of a detection result of the ranger.

(2)
The information processing device according to (1), in which
the predetermined pattern includes a plurality of sub-patterns that is different from each other and that is arranged on the end part of the stage side by side in a first direction along the end part of the stage.

(3)
The information processing device according to (2), in which
the estimator
estimates the self-location in the first direction on the basis of the predetermined pattern, and
estimates the self-location in a second direction intersecting the first direction on the basis of the distance.

(4)
The information processing device according to (2) or (3), in which
each of the plurality of sub-patterns includes a pattern indicating a binary code.

(5)
The information processing device according to any one of (2) to (4), in which
each of the plurality of sub-patterns includes a barcode pattern.

(6)
The information processing device according to any one of (1) to (5), in which
the predetermined pattern is a flat pattern including parts having different reflection characteristics relative to the infrared light.

(7)
The information processing device according to any one of (1) to (5), in which
the predetermined pattern is a pattern in a form of a three-dimensional structure.

(8)
The information processing device according to any one of (1) to (7), in which
the ranger includes a plurality of ranging sensors disposed in orientations different from each other.

(9)
The information processing device according to (8), in which
each of the plurality of ranging sensors measures a distance to an object within a detection plane intersecting a main axis, and
a direction of the main axis of each of the plurality of ranging sensors is different from a vertical direction of a stage surface of the stage.

(10)
The information processing device according to (9), in which
the number of the plurality of ranging sensors is three or more, and
lines at which the respective detection planes of the plurality of ranging sensors intersect the stage surface form a regular polygon.

(11)
The information processing device according to any one of (1) to (10), in which
the information processing device is provided in a movable moving apparatus.

(12)
An information processing method including:
detecting, using a ranger that performs ranging with infrared light, a distance to an end part of a stage and a predetermined pattern provided on the stage; and
estimating a self-location on the basis of a detection result of the ranger.

(13)
A moving apparatus including:
a ranger that detects a distance to an end part of a stage and detects a predetermined pattern provided on the stage, with infrared light;
an estimator that estimates a self-location on the basis of a detection result of the ranger; and
a movement mechanism that causes the apparatus to move on the basis of an estimation result of the estimator.

The present application claims the benefit of Japanese Patent Application No. 2021-054322 filed with the Japan Patent Office on Mar. 26, 2021, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. An information processing device, comprising:
a ranger configured to:
detect a first distance to an end part of a stage and a specific pattern on the stage, with infrared light, wherein
the ranger includes a plurality of ranging sensors each having a different orientation,
each ranging sensor of the plurality of ranging sensors is configured to measure a second distance to an object within a detection plane which intersects a main axis of the each ranging sensor of the plurality of ranging sensors,
a direction of the main axis of the each ranging sensor of the plurality of ranging sensors is different from a vertical direction of a stage surface of the stage,
the plurality of ranging sensors include at least three ranging sensors, and
a plurality of lines at which the detection plane of the each of the plurality of ranging sensors intersects the stage surface form a regular polygon; and
a processor configured to:
estimate a self-location based on a detection result of the ranger; and
determine, based on the estimated self-location, a movement plan to move a moving apparatus that includes the information processing device.

2. The information processing device according to claim 1, wherein
the specific pattern includes a plurality of sub-patterns,
each sub-pattern in the plurality of sub-patterns is different, and
the plurality of sub-patterns are on the end part of the stage, side by side in a first direction along the end part of the stage.

3. The information processing device according to claim 2, wherein the processor is further configured to:
estimate the self-location in the first direction based on a the specific pattern; and
estimate the self-location in a second direction based on the first distance, wherein the second direction intersects the first direction.

4. The information processing device according to claim 2, wherein the each sub-pattern of the plurality of sub-patterns includes a pattern indicating a binary code.

5. The information processing device according to claim 4, wherein the binary code indicates a location of a sub-pattern of the plurality of sub-patterns in the first direction.

6. The information processing device according to claim 2, wherein the each sub-pattern of the plurality of sub-patterns includes a barcode pattern.

7. The information processing device according to claim 1, wherein
the specific pattern is a two-dimensional pattern including a plurality of parts having different reflection characteristics relative to the infrared light.

8. The information processing device according to claim 1, wherein the specific pattern is a three-dimensional pattern.

9. The information processing device according to claim 1, wherein the specific pattern includes a material that reflects the infrared light.

10. An information processing method, comprising:
detecting, by a ranger that executes ranging with infrared light, a first distance to an end part of a stage and a specific pattern on the stage, wherein
the ranger includes a plurality of ranging sensors each having a different orientation, and
the plurality of ranging sensors include at least three ranging sensors;
measuring, by each ranging sensor of the plurality of ranging sensors, a second distance to an object within a detection plane which intersects a main axis of the each ranging sensor of the plurality of ranging sensors, wherein
a direction of the main axis of the each ranging sensor of the plurality of ranging sensors is different from a vertical direction of a stage surface of the stage, and
a plurality of lines at which the detection plane of the each of the plurality of ranging sensors intersects the stage surface form a regular polygon;
estimating, by a processor, a self-location based on a detection result of the ranger; and
determining, by the processor, based on the estimated self-location, a movement plan to move a moving apparatus.

11. A moving apparatus, comprising:
a ranger configured to:
detect a first distance to an end part of a stage and a specific pattern on the stage, with infrared light, wherein
the ranger includes a plurality of ranging sensors each having a different orientation,
each ranging sensor of the plurality of ranging sensors is configured to measure a second distance to an object within a detection plane which intersects a main axis of the each ranging sensor of the plurality of ranging sensors,
a direction of the main axis of the each ranging sensor of the plurality of ranging sensors is different from a vertical direction of a stage surface of the stage,
the plurality of ranging sensors include at least three ranging sensors, and
a plurality of lines at which the detection plane of the each of the plurality of ranging sensors intersects the stage surface form a regular polygon;
a processor configured to estimate a self-location based on a detection result of the ranger; and
a movement mechanism configured to move the moving apparatus based on a result of the estimation.

* * * * *